US010931642B2

(12) United States Patent
Park et al.

(10) Patent No.: US 10,931,642 B2
(45) Date of Patent: Feb. 23, 2021

(54) SYSTEM AND METHOD FOR TRAFFIC VOLUME PUBLICATION APPLYING DIFFERENTIAL PRIVACY

(71) Applicant: SOGANG UNIVERSITY RESEARCH FOUNDATION, Seoul (KR)

(72) Inventors: Seog Park, Seoul (KR); Gunhyoung Joe, Seongnam-si (KR)

(73) Assignee: SOGANG UNIVERSITY RESEARCH FOUNDATION, Seoul (KR)

( * ) Notice: Subject to any disclaimer, the term of this patent is extended or adjusted under 35 U.S.C. 154(b) by 340 days.

(21) Appl. No.: 16/198,954

(22) Filed: Nov. 23, 2018

(65) Prior Publication Data

US 2019/0166100 A1 May 30, 2019

(30) Foreign Application Priority Data

Nov. 28, 2017 (KR) ........................ 10-2017-0160491

(51) Int. Cl.
*G06F 7/04* (2006.01)
*H04L 29/06* (2006.01)
(Continued)

(52) U.S. Cl.
CPC ........... *H04L 63/04* (2013.01); *G08G 1/0129* (2013.01); *H04W 12/02* (2013.01); *H04L 2463/121* (2013.01)

(58) Field of Classification Search
CPC .. G08G 1/0129; G08G 1/0133; G08G 1/0141; G08G 1/096716; G08G 1/096775;
(Continued)

(56) References Cited

U.S. PATENT DOCUMENTS 6,810,321 B1* 10/2004 Cook ................... G08G 1/0104
340/905
2007/0150958 A1* 6/2007 Choi ..................... H04L 63/145
726/25
(Continued)

FOREIGN PATENT DOCUMENTS

JP 2003-196784 7/2003
JP 2008-102664 5/2008
(Continued)

OTHER PUBLICATIONS

C. Park et al., "Differentially Private Data Release Method for General Use of Data", Korea Information Science Society, pp. 1036-1038 (3 pages), Jun. 2017.

*Primary Examiner* — Gary S Gracia
(74) *Attorney, Agent, or Firm* — Lex IP Meister, PLLC

(57) ABSTRACT

A method for a traffic volume publication system to publish traffic volumes in a road traffic network includes: receiving traffic information including information on a plurality of road segments and original traffic volume data for the road segments at a first timestamp and calculating a first window size for each road segment for the first timestamp; predicting a second window size for a third timestamp subsequent to the first timestamp, either based on the first window size calculated at the first timestamp or based on the first window size and a window size calculated in advance at a second timestamp prior to the first timestamp; determining a privacy budget allocated to the first timestamp based on the first window size and the second window size; and returning noisy traffic volume data which is obtained by inserting noise into the original traffic volume data, based on the determined privacy budget.

13 Claims, 8 Drawing Sheets

(51) Int. Cl.
*H04W 12/02* (2009.01)
*G08G 1/01* (2006.01)
*G06F 7/16* (2006.01)

(58) Field of Classification Search
CPC .. H04L 2463/121; H04L 63/04; H04W 12/02; G06F 21/6245; G06Q 50/30
See application file for complete search history.

(56) References Cited

U.S. PATENT DOCUMENTS

| | | | |
|---|---|---|---|
| 2013/0145473 A1* | 6/2013 | Cormode | G11B 20/00086 726/26 |
| 2016/0153804 A1* | 6/2016 | Fowe | G08G 1/0141 701/118 |
| 2016/0343144 A1* | 11/2016 | No | G06K 9/6256 |
| 2016/0364983 A1* | 12/2016 | Downs | G08G 1/0141 |
| 2017/0118634 A1* | 4/2017 | Xiong | H04W 8/16 |
| 2017/0180230 A1* | 6/2017 | Mao | H04L 47/2408 |

FOREIGN PATENT DOCUMENTS

| | | |
|---|---|---|
| JP | 2014-178680 | 9/2014 |
| JP | 6099682 | 7/2015 |
| JP | 2016-012074 | 1/2016 |
| KR | 10-0414356 | 1/2004 |
| KR | 10-1753097 | 7/2017 |

\* cited by examiner

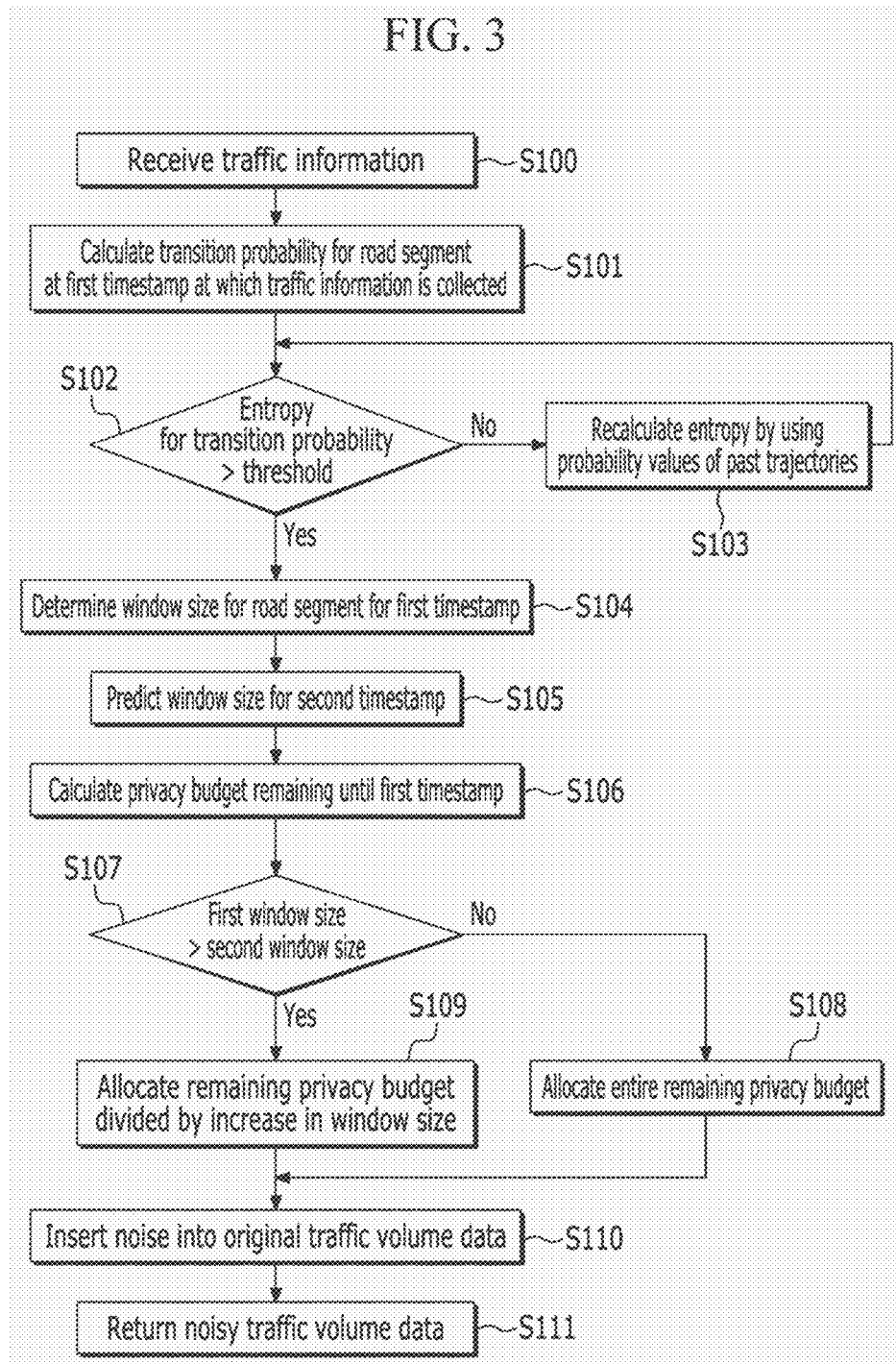

| t = | $t_1$ | $t_2$ | $t_3$ | $t_4$ | $t_5$ |
|---|---|---|---|---|---|
| $R_1$ | 10 | 20 | 35 | 32 | 29 |
| $R_2$ | 20 | 35 | 32 | 29 | 30 |
| $R_3$ | 35 | 32 | 29 | 30 | 33 |
| ⋮ | ⋮ | ⋮ | ⋮ | ⋮ | ⋮ |
| $R_n$ | 40 | 51 | 46 | 54 | 48 |

FIG. 5

| | |
|---|---|
| Algorithm 2. Publishing | |
| Input: | Transition matrices $tm_1, tm_2, \cdots, tm_t$ |
| | Timestamp $t$, Threshold of entropy $\theta$ |
| | Maximum window size $MaxW$ |
| Output: Window size for each road: $\{w_1, w_2, \cdots, w_n\}$ | |

| | |
|---|---|
| 1 | For each $R_i$ do |
| 2 |   Base_p = $tm_t(R_i)$; E = -Base_p * log(Base_p) |
| 3 |   If E > θ then Set $w_i$ = 2 |
| 4 |   Else |
| 5 |     Enqueue $R_i$ to Prev_road, Base_p to Prev_prob |
| 6 |     while $k = t - 1$ to $t - MaxW + 1$ and E > θ do |
| 7 |       Set E = 0 |
| 8 |       For each $R_j$ incident with Prev_road.pop() do |
| 9 |         P = $tm_k(R_j)$ * Prev_prob.pop() |
| 10 |         E += -P * log(P) |
| 11 |       If E > θ the Set $w_i = t - k + 2$ and break |
| 12 |       Else Enqueue $R_j$ to Prev_road, P to Prev_prob |

SYSTEM AND METHOD FOR TRAFFIC VOLUME PUBLICATION APPLYING DIFFERENTIAL PRIVACY

CROSS-REFERENCE TO RELATED APPLICATION

This application claims priority to and the benefit of Korean Patent Application No. 10-2017-0160491 filed in the Korean Intellectual Property Office on Nov. 28, 2017, the entire contents of which are incorporated herein by reference.

BACKGROUND OF THE INVENTION (a) Field of the Invention

The present invention relates to a system and method for traffic volume publication using differential privacy.

(b) Description of the Related Art

Recently, there has been a need for periodically published stream data in many fields such as traffic analysis and trend analysis. Since such stream data contains sensitive private information, there is concern about invasion of privacy when it comes to identifying individuals. Thus, differential privacy is used to protect private information and control the validity of data by adding noise to the data.

However, stream data is infinite in time, so a large amount of noise is added to the data to protect all the data published, thereby decreasing the validity of the data. To overcome this drawback, research has been recently conducted to apply differential privacy only to traffic volume data contained in a window.

However, the conventional use of differential privacy still has the drawback that timestamps of when data is collected are not taken into consideration because the window size is fixed, and that a lot of unnecessary noise is added without considering correlations among road segments.

PRIOR ART DOCUMENTS

Patent Documents (Patent Document 1) Korean Registered Patent Publication No. 10-1753097 (registration date: 2017 Jun. 27)
(Patent Document 2) Korean Registered Patent Publication No. 10-0414356 (registration date: 2003 Dec. 23)

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a system and method for traffic volume publication using differential privacy which use a variable length window technique by taking correlations among road segments and timestamps into consideration.

An exemplary embodiment of the present invention provides a method for a traffic volume publication system to publish traffic volumes in a road traffic network, the method including: receiving traffic information including information on a plurality of road segments and original traffic volume data for the road segments at a first timestamp and calculating a first window size for each road segment for the first timestamp; predicting a second window size for a third timestamp subsequent to the first timestamp, either based on the first window size calculated at the first timestamp or based on the first window size and a window size calculated in advance at a second timestamp prior to the first timestamp; determining a privacy budget allocated to the first timestamp based on the first window size and the second window size; and returning noisy traffic volume data which is obtained by inserting noise into the original traffic volume data, based on the determined privacy budget.

The calculating of a first window size may include: calculating the transition probability for each of the road segments at the first timestamp; determining whether entropy for the calculated transition probability is larger than a preset threshold; and if the transition probability is larger than the threshold, setting the first window size to a preset value.

The transition probability may be calculated as the transition probability for each road segment at the first timestamp, and the entropy for the transition probability may be calculated using the transition probability and a logarithm of the transition probability.

The calculating of a first window size may further include, if the transition probability is smaller than the threshold, recalculating the entropy by using the probability values of past trajectories prior to the first timestamp in the corresponding road segment of which transition probability is smaller than the threshold.

The determining of a privacy budget may further include calculating the privacy budget remaining until the first timestamp.

The determining of a privacy budget may include, if the first window size is larger than the second window size, allocating the entire remaining privacy budget as the privacy budget for the first timestamp.

The determining of a privacy budget may include, if the first window size is smaller than the second window size, allocating the remaining privacy budget divided by the increase from the first window size to the second window size as the privacy budget for the first timestamp.

The returning of noisy traffic volume data may include: calculating the amount of noise to be inserted into the original traffic volume data, based on the privacy budget allocated for the first timestamp; and inserting as much noise as calculated into the original traffic volume data.

Another exemplary embodiment of the present invention provides a system for traffic volume publication in a road traffic network, the system including: a window size calculation module that calculates a first window size for each of a plurality of road segments at a first timestamp based on traffic information including information on the road segments and original traffic volume data for the road segments; a window size prediction module that predicts a second window size for a third timestamp subsequent to the first timestamp, either based on the first window size calculated at the first timestamp or based on the first window size and a window size calculated in advance at a second timestamp prior to the first timestamp; and a traffic volume publication module that publishes noisy traffic volume data by calculating the amount of noise to be inserted into the original traffic volume data at the first timestamp by using the calculated first window size and the predicted second window size.

The window size calculation module may calculate the transition probability for each road segment at the first timestamp, compare the entropy for the calculated transition probability to a preset threshold, and calculate the first window size by using the preset threshold or the entropy calculated based on the probability values of past trajectories prior to the first timestamp.

The traffic volume publication module may obtain the privacy budget remaining from the privacy budget used for the window for each road segment at the first timestamp, based on the first window size and the second window size.

If the first window size is larger than the second window size, the traffic volume publication module may allocate the entire remaining privacy budget as the privacy budget for the first timestamp.

If the first window size is smaller than the second window size, the traffic volume publication module may allocate the remaining privacy budget divided by the increase from the first window size to the second window size as the privacy budget for the first timestamp.

The traffic volume publication module may calculate the amount of noise to be inserted into the original traffic volume data based on the privacy budget allocated for the first timestamp.

According to the present invention, original traffic volume data has fewer errors because the window length varies depending on correlation among road segments and timestamps.

BRIEF DESCRIPTION OF THE DRAWINGS

FIG. 3 is a flowchart of a traffic volume publication method according to an exemplary embodiment of the present invention.

FIG. 5 is an exemplary view of a window size calculation algorithm according to an exemplary embodiment of the present invention.

DETAILED DESCRIPTION OF THE EMBODIMENTS

Figure 1:
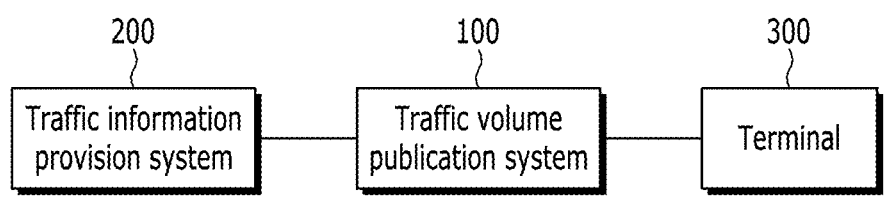
FIG. 1 is an exemplary view of an environment in which a traffic volume publication system according to an exemplary embodiment of the present invention is applied.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Hereinafter, a traffic volume publication system and a traffic volume publication method using the same according to an exemplary embodiment of the present invention will be described in detail with reference to the drawings.

Prior to explaining an exemplary embodiment of the present invention, the term "window" as used herein is defined as the minimum amount of time in which a variety of trajectories can be included when a vehicle arrives at the current road segment.

FIG. 1 is an exemplary view of an environment in which a traffic volume publication system according to an exemplary embodiment of the present invention is applied.

As shown in FIG. 1, the traffic volume publication system 100 works in conjunction with a traffic information provision system 200 for collecting and providing traffic volumes and a terminal 300 for receiving traffic volumes calculated and published based on traffic information. Here, the traffic information provision system 200 and the terminal 300 are not limited to a certain type. While the exemplary embodiment of the present invention will be described with an example in which the traffic volume publication system 100 and the traffic information provision system 200 are implemented as physically separate systems, they may also be integrated in one system.

The traffic information provision system 200 collects traffic information and provides it to the traffic information publication system 100. The traffic information collected by the traffic information provision system 200 includes information on times when the traffic information is collected, information on vehicles present in road segments at those times, information on trajectories along which those vehicles move, road segment information, traffic volume data, and so on.

Here, a road traffic network from which actual traffic information is collected and traffic volume data contained in the traffic information received by the traffic volume publication system 100 will be described first with reference to FIGS. 4(a) and 4(b).

Figures 4A, 4B:
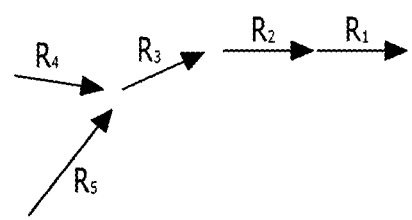
FIGS. 4(a) and 4(b) show exemplary views of a road traffic network and original traffic volume data according to an exemplary embodiment of the present invention.

FIGS. 4(a) and 4(b) show exemplary views of a road traffic network and original traffic volume data according to an exemplary embodiment of the present invention.

FIG. 4(a) is a schematic exemplary view of a road traffic network from which traffic data is collected, and FIG. 4(b) is an exemplary view of original traffic volume data.

As shown in FIG. 4(a), each road segment is given identification information R1~R5, and original traffic volume data published at a certain time t is as shown in the columns of FIG. 4(b). As published data accumulates, it takes the form of a table as shown in FIG. 4(b).

For a certain natural number w, a first trajectory $S_t$ and a second trajectory St' with length t are designated as w-neighboring if the following two conditions are satisfied.

For $1 \leq i_1 < i_2 \leq t$, $i_2 - i_1 + 1 \leq w$.

For $1 \leq i_1 < i_2 \leq t$, $S_t[i_1] \neq S_t'[i_1]$ and $S_t[i_2] \neq S_t'[i_2]$. Here, i denotes an i-th index. That is, St denotes a place or road on a movement trajectory St with a length t a vehicle visits an i-th time.

For instance, a description will be given with an example in which, for t=5 and w=3, $S_t = \{R_1, R_3, R_5, R_2, R_7\}$ and $S_t' = \{R_1, R_4, R_6, R_3, R_7\}$. Here, St and St' represent a trajectory with a length 5, and $R_k$ denotes a place or road the vehicle visited. $S_t$ and $S_t'$ represent sets, and the sequence of elements in each set is an ordered list of places or roads the vehicle visited.

For w=3, if $i_1=2$, $S_t[i_1]$ equals $R_3$ and $S_t[i_1]$ equals $R_4$. Likewise, for w=3, if $i_2=4$, $[i_2]$ equals $R_2$ and $S_t[i_2]$ equals $R_3$. Hence, given that $S_t[i_1] \neq S_t'[i_1]$, $S_t[i_2] \neq S_t'[i_2]$, and $i_2 - i_1 + 1 \leq 3$, St and St' are 3-neighboring each other.

Here, if a certain algorithm A satisfies a w-event, it means that the two trajectories $S_t$ and $S_t'$ w-neighboring each other are taken as input and all outputs r satisfy the following Mathematical Formula 1.

$$\log\left(\frac{Pr(\mathcal{A}(S_t) = r)}{Pr(\mathcal{A}(S_t') = r)}\right) \le \epsilon \quad \text{[Mathematical Formula 1]}$$

For example, it is assumed that 3-event $\epsilon$-differential privacy is satisfied for traffic volume data in FIG. 4(*b*). Then, when traffic volume data is published at $t_3$, the window corresponding to t3 is $W_{t_3}$, which encompasses the columns of t1, t2, and t3, and $\epsilon_1 + \epsilon_2 + \epsilon_3 \le \epsilon$ is satisfied. This means that each vehicle's trajectory is protected for a period from the time t of traffic volume data publication to the previous timestamp t−w−1.

Meanwhile, referring again to FIG. 1, the traffic volume publication system 100 receives traffic information from the traffic information provision system 200, and varies the window length based on the time information and road segment information contained in the traffic information. Then, the traffic information to which the varied window length is applied is processed to generate traffic volume information. The traffic information generated by the traffic volume publication system 100 is published for the terminal 300.

Now, a structure of the traffic volume publication system 100 which processes traffic information to generate traffic volume information will be described with reference to FIG. 2.

Figure 2:
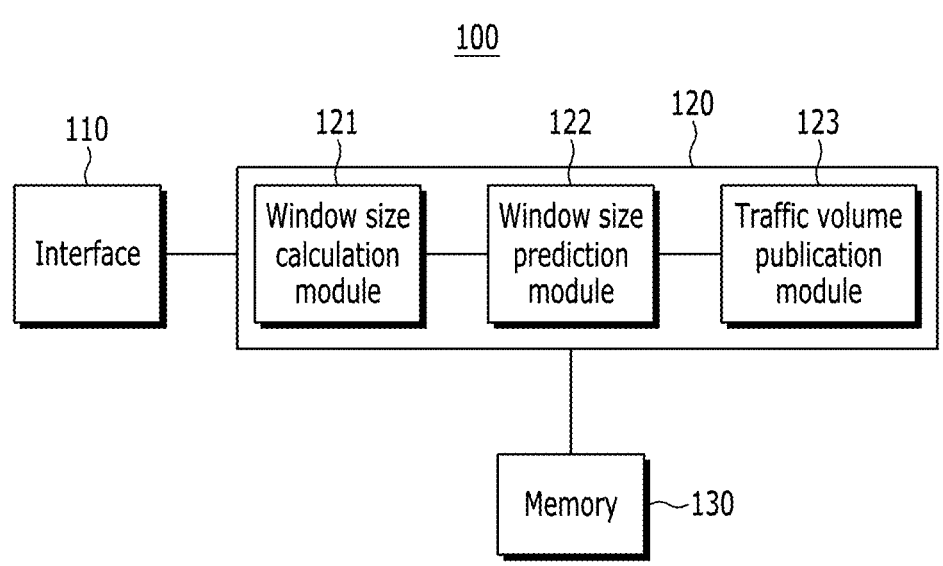
FIG. 2 is a structural diagram of a traffic volume publication system according to an exemplary embodiment of the present invention.

FIG. 2 is a structure diagram of a traffic volume publication system according to an exemplary embodiment of the present invention.

As shown in FIG. 2, the traffic volume publication system 100 includes an interface 110, a processor 120, and a memory 130. The processor 120 includes a window size calculation module 121, a window size prediction module 122, and a traffic volume publication module 123.

The interface 110 works in conjunction with the traffic information provision system 200 and the terminal 300. Also, the interface 110 receives traffic information transmitted from the traffic information provision system 200, and delivers traffic volume information generated by the processor 120 to the terminal 300. Here, the traffic information includes information on times when the traffic information is collected, information on vehicles present in road segments at those times, information on trajectories along which those vehicles move, road segment information, and so on.

The window size calculation module 121 identifies road segments from the traffic information received via the interface 110. Then, it calculates the window size for each of the identified road segments. Here, the window size for each road segments calculated by the window calculation module 121 is called a "first window size", and an algorithm for calculating the first window size will be explained first with reference to FIG. 5.

FIG. 5 is an exemplary view of a window size calculation algorithm according to an exemplary embodiment of the present invention.

As shown in FIG. 5, the window size calculation module 121 calculates the transition probability Base_p for each road segment $R_i$ at the current timestamp t. The window size calculation module 121 determines whether the corresponding road segment is an intersection or not, based on the entropy for the calculated transition probability.

That is, if the entropy for the transition probability is larger than a preset threshold θ, the corresponding road segment is identified as located off an intersection. Once identified as an intersection, the window size calculation module 121 sets the window size of the corresponding segment to 2.

On the other hand, if the entropy for the transition probability is smaller than the threshold, the entropy is recalculated by using the probability values of past trajectories connected to the corresponding road segment by using BFS. This process is repeated until the entropy becomes larger than the threshold. The window size calculation module 121 sets the window size to not exceed a preset size MaxW, in order to prevent the insertion of too much noise.

Meanwhile, after the window size calculation module 121 calculates the window size of a road segment, the window size prediction module 122 of FIG. 2 predicts the window size for the next timestamp.

That is, the window size varies because the transition matrix depends on timestamps. On the other hand, in w-event privacy, a privacy budget is allocated for each time unit. Thus, when the window size increases, there will be no remaining privacy budget to be allocated, causing a problem of allocating a budget of zero. For example, it is assumed that a window with a size of 3 at the timestamp t increases to 4 at the timestamp t+1. Then, a privacy budget of zero is allocated to the timestamp t+1 since there is no remaining privacy budget in the window. This means that an infinite amount of noise is inserted.

Accordingly, the window size prediction module 122 obtains $tm_{t+1}$ by multiplying the previous Maxw−1 transition matrices according to the Markov assumption, since the w-event privacy technique takes into consideration only the data for the previous w−1 time units. Then, the window size is obtained in the same way as the algorithm explained with respect to FIG. 5.

The traffic volume publication module 123 obtains the privacy budget $\epsilon_{rm,i}$ remaining from the privacy budget used for the window for each road segment until the current timestamp, based on a first window size for the current timestamp calculated by the window size calculation module 121 and a second window size for the next timestamp predicted by the window size prediction module 122.

If the first window size is smaller than the second window size, the remaining privacy budget divided by the increase in window size is allocated as the privacy budget for the current timestamp.

However, if the first window size is larger than or equal to the second window size, the entire remaining privacy budget is allocated as the privacy budget for the current timestamp.

A traffic volume publication algorithm for allocating a privacy budget by the traffic volume publication module 123 will be described first with reference to FIG. 6.

Figure 6:
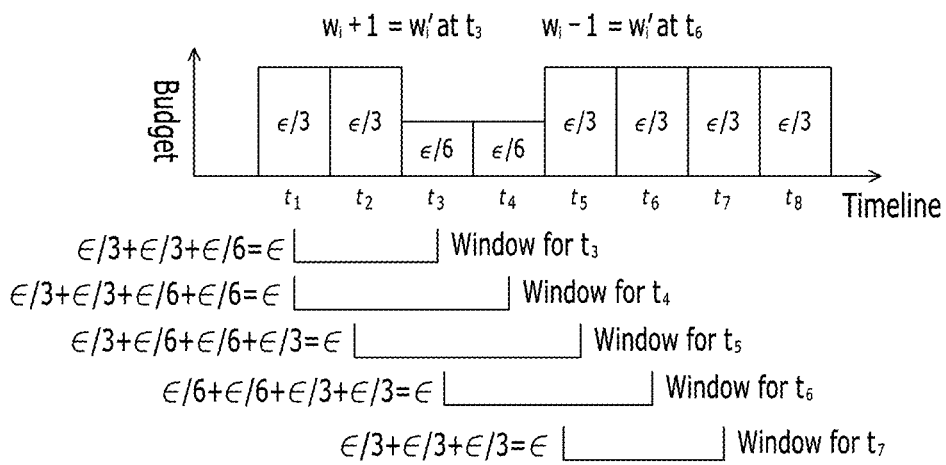
FIG. 6 is an exemplary view of a traffic volume publication algorithm according to an exemplary embodiment of the present invention.

FIG. 6 is an exemplary view of a traffic volume publication algorithm according to an exemplary embodiment of the present invention.

As shown in FIG. 6, when the first window size and second window size for each road segment $R_i$ are obtained at the first timestamp t, the privacy budget $\epsilon_{rm,i}$ remaining from the privacy budget used for the window for the road segment $R_i$ until the first timestamp t is obtained. If the first window size is smaller than the second window size, the remaining privacy budget divided by the increase in window size is allocated as the privacy budget for the first timestamp.

On the other hand, if the window size does not increase, the entire remaining privacy budget is allocated as the privacy budget $\epsilon_{t,i}$ for the first timestamp.

The traffic volume publication module 123 inserts noise into the original traffic volume data for each road segment $R_i$ according to the Laplace distribution $1/\epsilon_{t,i}$, and returns noisy traffic volume data.

A process for a proposed technique for MaxW=4 will be described with reference to FIG. 6. First, it is assumed that the window size of 3 for each road segment $R_i$ is maintained from the first timestamp t1 to the third timestamp t3, and that the second window size increases to 4 at the third timestamp. The remaining budget in the window at the third timestamp t3 is $\epsilon_{rm,i}=\epsilon-(\epsilon/3+\epsilon/3)$. Then, the traffic volume publication module 123 allocates only half of the remaining budget to $\epsilon_{t_3,i}$ according to the algorithm so that the budget can be used at the fourth timestamp $t_4$.

Also, it is assumed that the window size for the next timestamp is smaller by 1 than the window size for the sixth timestamp t6. In this case, the entire remaining budget $\epsilon_{rm,i}=\epsilon/3$ is allocated to $\epsilon_{t_6,i}$. Since the window for the seventh timestamp $t_7$ only includes the fifth timestamp $t_5$, sixth timestamp $t_6$, and seventh timestamp $t_7$, it can be seen that the MaxW-event privacy is still satisfied.

Meanwhile, the memory 130 of FIG. 2 stores various programs for running the traffic volume publication system 100. Moreover, it stores and manages traffic volume data returned by the traffic volume publication module 123. The stored traffic volume data may be transmitted to the terminal 300 via the interface 110. If the traffic volume data is not required, it may be deleted from the memory 130 at set intervals.

A method of publishing traffic volume data using the above-explained traffic volume publication system 100 will now be described with reference to FIG. 3.

FIG. 3 is a flowchart of a traffic volume publication method according to an exemplary embodiment of the present invention.

As shown in FIG. 3, the traffic volume publication system 100 receives traffic information from the traffic information provision system 200 (S100).

Here, the traffic information includes information on times when the traffic information is collected, information on vehicles present in road segments at those times, information on trajectories along which those vehicles move, road segment information, traffic volume data, and so on.

The traffic volume publication system 100 calculates the transition probability for each road segment at the first timestamp at which the traffic information received in the step S100 is collected (S101). If there is no vehicle that has moved from a first road segment to a second road segment, the transition probability is zero. On the other hand, if there are any vehicles that have moved from the first road segment to the second road segment, the transition probability is calculated based on the number of vehicles that have moved. Here, the traffic volume publication system 100 calculates the transition probability by the following Mathematical Formula 2, based on the algorithm explained previously with reference to FIG. 5.

Transition probability $(Base\_p)=tm_t(R_i)$ [Mathematical Formula 2]

Here, $tm_t$ represents the transition matrix at time t. Each row and column of the transition matrix represent one road segment, and the transition matrix element $tm_t[r][c]$ represents the probability that vehicles on a road segment corresponding to the row r will be on a road segment corresponding to the column c at the previous timestamp t−1.

By calculating the transition probability, the traffic volume publication system 100 determines whether the entropy for the calculated transition probability is larger than a preset threshold (S102). Here, the entropy for the transition probability is calculated by the following Mathematical Formula 3.

Entropy for transition probability $(E)=-Base\_p*\log(Base\_p)$ [Mathematical Formula 3]

If the entropy calculated by Mathematical Formula 2 is smaller than the preset threshold, the entropy is recalculated by using the probability values of past trajectories in the corresponding road segment (S103). The entropy recalculation procedure is repeated until the calculated entropy is larger than the threshold.

On the other hand, if the calculated entropy is larger than the preset threshold, the traffic volume publication system 100 determines the window size for each road segment for the first timestamp (S104). Here, a description will be given with respect to an example in which the window size is set to 2, and the window size determined in step S104 is called a first window size.

If the first window size is set to 2, the traffic volume publication system 100 predicts the window size for the next timestamp, i.e., the second timestamp, at the first timestamp at which traffic information is collected to determine the first window size (S105). The window size for the second timestamp varies because the transition matrix depends on timestamps.

Accordingly, the traffic volume publication system 100 obtains the window size for the second timestamp by multiplying (maximum window size−1) transition matrices at the third timestamp just prior to the first timestamp. That is, the window size for the second timestamp is obtained by the equation $tm_{t+1}=tm_{t-MaxW+2}*tm_{t-MaxW+3}*\ldots*tm_t$. Eventually, the window size for the second timestamp (hereinafter referred to as second window size) is predicted by using the algorithm of FIG. 5.

Once the first window size and the second window size are calculated or predicted, the traffic volume publication system 100 calculates the privacy budget remaining until the first timestamp (S106). To calculate the remaining privacy budget $\epsilon_{rm,i}$ in the step S106, the traffic volume publication system 100 uses the following Mathematical Formula 4:

$$\epsilon_{rm,i} = \epsilon - \sum_{k=t-w_i+1}^{t-1} \epsilon_{k,i}$$ [Mathematical Formula 4]

where $\epsilon$ represents the privacy budget allocated to the window, and k represents the earliest timestamp included in the window for $R_i$. That is, the sigma term represents the sum of the privacy budgets allocated to the time units included in the window.

After calculating the remaining privacy budget through Mathematical Formula 3, the traffic volume publication system 100 determines whether the first window size is smaller than the second window size (S107). If the second window size is smaller, the remaining privacy budget calculated in the step S106 is allocated to the first timestamp (S108).

However, if the first window size is smaller than the second window size, the remaining privacy budget divided by the increase from the first window size to the second window size is allocated to the first timestamp (S109). Next, noise is inserted into the original traffic volume data for the corresponding road segment (S110), and then noisy traffic volume data is returned (S111). Here, the amount of noise inserted in the step S110 is determined according to the Laplace distribution $1/\epsilon_{t,i}$.

An example of comparing traffic volume data published according to the above procedure to traffic volume data published according to the conventional traffic volume data publication method will now be described with reference to FIGS. 7(a) and 7(b).

Figure 7A:
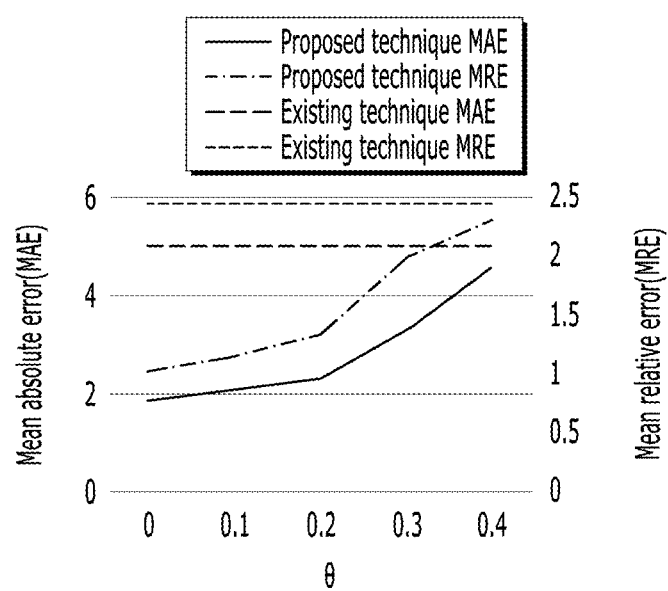
FIGS. 7(a) and 7(b) are exemplary views of error values according to an exemplary embodiment of the present invention.
Figure 7B:
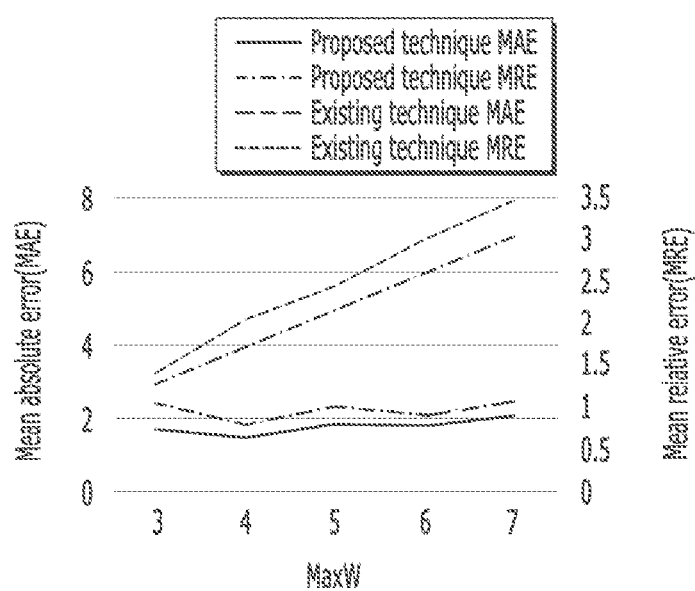

FIGS. 7(a) and 7(b) are exemplary views of error values according to an exemplary embodiment of the present invention.

As shown in FIGS. 7(a) and 7b), the amount of noise inserted into each road segment is evaluated with respect to a mean absolute error 1 and a mean relative error 2, and the evaluation is done by using the following Mathematical Formula 5. The results show the average values obtained by repeating the experiment 10 times, and $\epsilon$ is fixed to 1. The prediction failure probability for each window size is approximately 3 %, but noise insertion is not taken into account.

$$\text{Mean absolute error (MAE)} = \Sigma_{r \in R}(|D(r)-D'(r)|/|R|)$$

$$\text{Mean relative error (MRE)} = \Sigma_{r \in R}(|D(r)-D'(r)|/|R|*D(r))$$

[Mathematical Formula 5]

Herein, D(r) is the original traffic volume for the road segment r, D'(r) is the traffic volume with noise inserted therein, and R is the set of all road segments.

A threshold determines the window size for the road segment. As the threshold value increases, the average window size increases. This finding implies a reduction of the privacy budget allocated to each time unit and the insertion of more noise.

As shown in FIG. 7(a), the mean absolute and relative errors in the traffic volume for each road segment varying with the threshold when MaxW=5 may be estimated. From this, it can be seen that, using the method according to an exemplary embodiment of the present invention, the mean absolute and relative errors become closer to those in the existing method as the threshold increases.

As shown in FIG. 7(b), MaxW represents the maximum value of the window size for each road segment. As MaxW increases, the privacy budget allocated to each time unit decreases and more noise is inserted.

The mean absolute and relative errors in the traffic volume for each road segment varying with MaxW when the threshold is zero may be estimated. In the existing method, as MaxW increases, more noise is inserted because the same MaxW is applied to all road segments. By contrast, in a method according to an exemplary embodiment of the present invention, it can be seen the errors are relatively constant because there are many road segments with a window size smaller than MaxW.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for a traffic volume publication system to publish traffic volumes in a road traffic network, the method comprising:
   receiving traffic information including information on a plurality of road segments and original traffic volume data for the road segments at a first timestamp and calculating a first window size for each road segment for the first timestamp depending on the result of comparing a transition probability calculated for each road segment at the first timestamp to a preset threshold, wherein the traffic information includes information on times when the traffic information is collected, information on vehicles present in road segments at those times, information on trajectories along which those vehicles move, road segment information, and traffic volume data;
   predicting a second window size for a third timestamp subsequent to the first timestamp, either based on the first window size calculated at the first timestamp or based on the first window size and a window size calculated in advance at a second timestamp prior to the first timestamp;
   determining a privacy budget allocated to the first timestamp based on the first window size and the second window size; and
   returning noisy traffic volume data which is obtained by inserting noise into the original traffic volume data, based on the determined privacy budget, wherein published stream of traffic volume data includes sensitive private information of a plurality of individuals and creating differential privacy information which is protected by adding noise to the original traffic data.

2. The method of claim 1, wherein the calculating of a first window size comprises:
   determining whether entropy for the calculated transition probability is larger than a preset threshold; and
   if the transition probability is larger than the threshold, setting the first window size to a preset value.

3. The method of claim 2, wherein
   the transition probability is calculated as the transition probability for each road segment at the first timestamp, and
   the entropy for the transition probability is calculated using the transition probability and a logarithm of the transition probability.

4. The method of claim 2, wherein the calculating of a first window size further comprises, if the transition probability is smaller than the threshold, recalculating the entropy by using the probability values of past trajectories prior to the first timestamp in the corresponding road segment of which transition probability is smaller than the threshold.

5. The method of claim 1, wherein the determining of a privacy budget further comprises calculating the privacy budget remaining until the first timestamp.

6. The method of claim 5, wherein the determining of a privacy budget comprises, if the first window size is larger than the second window size, allocating the entire remaining privacy budget as the privacy budget for the first timestamp.

7. The method of claim 6, wherein the determining of a privacy budget comprises, if the first window size is smaller than the second window size, allocating the remaining privacy budget divided by the increase from the first window size to the second window size as the privacy budget for the first timestamp.

8. The method of claim 7, wherein
   the returning of noisy traffic volume data comprises:
   calculating the amount of noise to be inserted into the original traffic volume data, based on the privacy budget allocated for the first timestamp; and
   inserting as much noise as calculated into the original traffic volume data.

9. A system for traffic volume publication in a road traffic network, the system comprising:
- a window size calculation module that calculates a transition probability for each of a plurality of road segments at a first timestamp, based on traffic information including information on the road segments and original traffic volume data for the road segments, and that compares entropy for the calculated transition probability to a preset threshold and calculates a first window size for each road segment for the first timestamp by using the preset threshold or the entropy calculated based on the probability values of past trajectories prior to the first timestamp, wherein the traffic information includes information on times when the traffic information is collected, information on vehicles present in road segments at those times, information on trajectories along which those vehicles move, road segment information, and traffic volume data;
- a window size prediction module that predicts a second window size for a third timestamp subsequent to the first timestamp, either based on the first window size calculated at the first timestamp or based on the first window size and a window size calculated in advance at a second timestamp prior to the first timestamp; and
- a traffic volume publication module that publishes noisy traffic volume data by calculating the amount of noise to be inserted into the original traffic volume data at the first timestamp by using the calculated first window size and the predicted second window size, wherein published stream of traffic volume data includes sensitive private information of a plurality of individuals and the differential privacy information is protected by adding noise to the original traffic data and wherein the window size calculation module, the window size prediction module, and the traffic volume publication module is executed by a hardware processor.

10. The system of claim 9, wherein the traffic volume publication module obtains the privacy budget remaining from the privacy budget used for the window for each road segment at the first timestamp, based on the first window size and the second window size.

11. The system of claim 10, wherein, if the first window size is larger than the second window size, the traffic volume publication module allocates the entire remaining privacy budget as the privacy budget for the first timestamp.

12. The system of claim 11, wherein, if the first window size is smaller than the second window size, the traffic volume publication module allocates the remaining privacy budget divided by the increase from the first window size to the second window size as the privacy budget for the first timestamp.

13. The system of claim 12, wherein the traffic volume publication module calculates the amount of noise to be inserted into the original traffic volume data, based on the privacy budget allocated for the first timestamp.

* * * * *